Aug. 17, 1965 W. R. JOHNSON ETAL 3,201,770

MAGNETIC TRANSDUCING SYSTEM

Filed June 8, 1959 5 Sheets-Sheet 1

INVENTORS:
Wayne R. Johnson
Charles L. Vice

By Smyth & Roston
Attorneys.

INVENTORS:
Wayne R. Johnson
Charles L. Vice
By Smyth & Roston
Attorneys

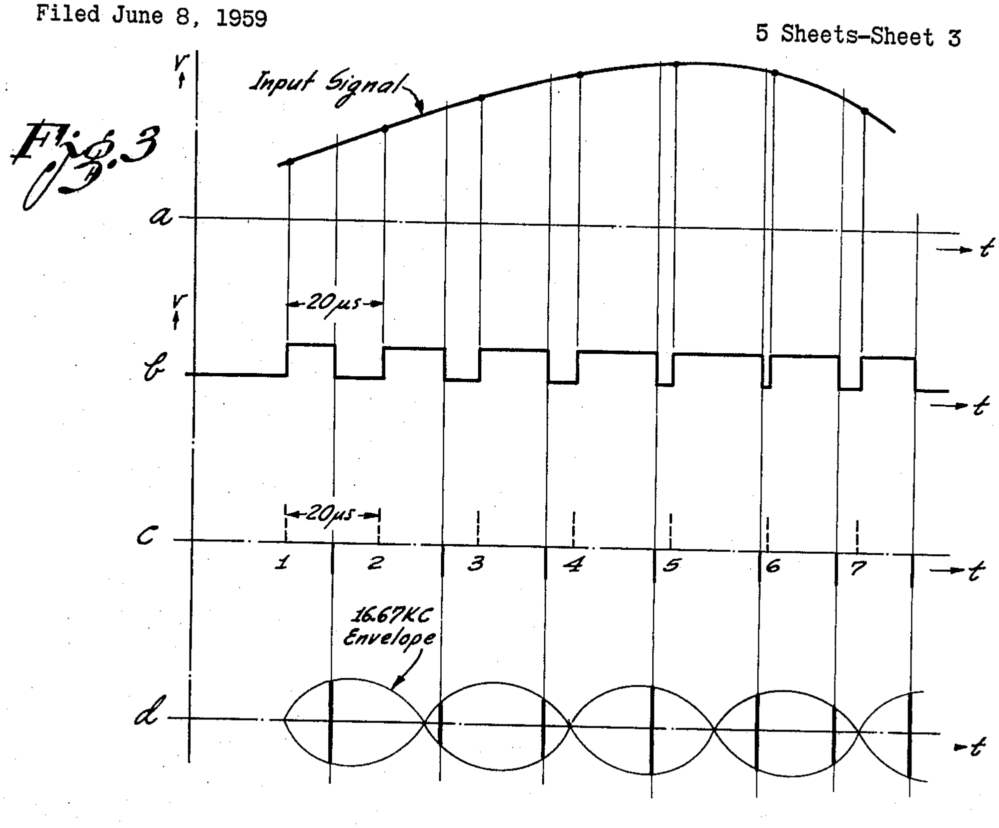
Fig. 7
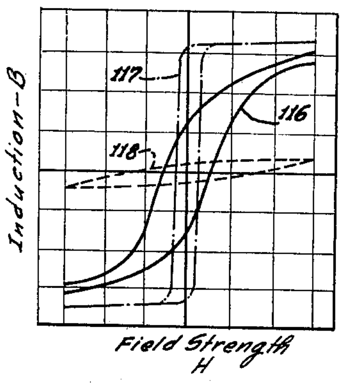
INVENTORS:
Wayne R. Johnson
Charles L. Vice
By Smyth & Roston
Attorneys,

MAGNETIC TRANSDUCING SYSTEM

Filed June 8, 1959 5 Sheets-Sheet 4

INVENTORS.
Wayne R. Johnson
Charles L. Vice
By Smyth & Roston
Attorneys

INVENTORS.
Wayne R. Johnson
Charles L. Vice
By Smyth & Roston
Attorneys,

United States Patent Office 3,201,770
Patented Aug. 17, 1965

3,201,770

MAGNETIC TRANSDUCING SYSTEM

Wayne R. Johnson, Los Angeles, and Charles L. Vice, Pasadena, Calif., assignors to Minnesota Mining and Manufacturing Company, St. Paul, Minn., a corporation of Delaware Filed June 8, 1959, Ser. No. 818,810
12 Claims. (Cl. 340—174.1)

This invention relates to magnetic transducing systems and, more particularly, to a system for magnetically recording graphic representations of varying electrical signals and then for developing signals from the recorded graphic representations which correspond to the varying electrical signals.

Apparatus for producing a written or visible curve representing variable current, voltage or other electrical quantities is generally referred to as an oscillograph. In one such apparatus, electric oscillations in a circuit cause electromagnetic vibrations of a filament bearing a mirror which reflects a high-beam onto a moving photographic film. Other oscillographs utilize a slave coil which carries a pen to record the magnitude of the varying signals on a moving paper chart. Some apparatus which provide a visible indication of a varying electrical quantity, utilize cathode ray tubes and are generally referred to as oscilloscopes even when a recording is produced.

In a specific illustrative embodiment of this invention, photographic equipment, inking pens and optical systems, with their accompanying limitations of slow speed and complexity, are not required to provide a graphic representation of varying electrical quantities. The illustrative embodiment includes a single magnetic transducing head which simultaneously records a number of curves representing respectively a number of varying quantities on a moving magnetic medium. Duplication of recording equipment such as inking pens, optical systems, cathode ray tubes, etc., for each of the varying input signals is not required to provide a visible image of the simultaneously produced curves.

The magnetic transducer head, which is a travelling wave transducer head of the type described in detail in my copending patent application 733,165 filed on May 5, 1958, now Patent No. 3,053,941 transversely records signals derived from the input varying quantities on successive transverse tracks of the moving magnetic medium. The transducer head which is stationary is provided with a tubular shape disposed in a transverse direction across the recording medium. Transverse recording is achieved, even though the transducer head is stationary, by exciting in the head longitudinal elastic waves which move transversely with respect to the direction of the movement of the recording medium. The transducer head includes a magnostrictive tube and the elastic waves momentarily relieve stresses normally in the tube so that, in effect, the elastic waves function as enabling waves by locally changing the permeability of the tube.

The input varying signals are periodically sampled at the same time the elastic pulses are excited in the transducer head to record transverse tracks across the magnetic recording medium. The instantaneous magnitudes of the sampled input signals are converted by separate multivibrators to variable duration pulses.

The varying duration or width pulses for each of the input signals are differentiated so that the pulses derived at the trailing edge of the varying-width pulses are effectively time position pulses indicating the instantaneous magnitude of the associated input varying signal. Each series of differentiated or time position pulses derived from the input varying signals is amplitude modulated by different frequency identifying signals. The identifying signals may be supplied under control of a sequence control circuit which effectively gates the modulated differentiated pulses in accordance with an identifying code.

Each set of differentiated pulses may, therefore, be modulated by two identifying signals: the first by a frequency-identifying signal which is utilized during the reproduction sequence to provide an output signal corresponding to the input signals; and the second by blanking or gating the modulated pulses in accordance with an identifying code which is utilized to provide a visible identification of the recorded curve on the magnetic recording medium.

The doubly identified series of pulses derived from each of the input signals are introduced to the travelling wave transducer head for recording. One pulse may be recorded for each input signal in each transverse track, with the transverse position of the recorded pulse on the medium depending upon its time position relative to the pulse which excites the transverse wave in the transducer head. The recorded signals or pulses in the successive transverse tracks derived from each of the input varying signals forms a latent image of a curve which is a graphic representation of the varying input signal. The recording medium may be passed through an inking apparatus which coats the latent-curve images with a visible magnetic solution so that the curves coded in accordance with the sequence control signals are visible. The amplitude modulation by the frequency identifying signals is not apparent.

The recorded information may also be reproduced by utilizing the transducer head, and output varying signals corresponding respectively to the input varying signals may be derived from the reproduced signals. When the recorded information is reproduced, the transducer head couples the reproduced signals to a set of narrow band filters, each tuned to the frequency of one of the frequency identifying signals. The output of each of the filters is a sinusoidal signal having a phase dependent upon the instantaneous transverse location of the recorded pulse in the curve on the recording medium.

The reproduced sinusoidal signals are coupled to individually associated differentiating circuits which supply the successive series of differentiated pulses to successively reset individually associated flip-flop circuits. The flip-flop circuits are set at the beginning of each transverse track at the same time that a transverse pulse in the head is initiated so that it remains set for a duration depending upon the phase of the reproduced signal. The output of each of the flip-flop circuits is integrated so that a signal is produced by each integrator having a magnitude which varies with phase of the reproduced signal and therefore with the position of the associated pulse recorded on the medium. Each of the integrated signals, therefore, is similar to its corresponding input varying signal.

The recorded magnetic tape may also be passed through an inking apparatus which coats the magnetized portions of the tape with a magnetic solution. The curves thereupon become visible and may be transferred if so desired to printing paper so that a continuous visible print of the latent curves on the magnetic tape may be provided.

Further advantages and features of this invention will be apparent upon consideration of the following description read in conjunction with the drawing wherein:

FIGURES 1 and 2, with FIGURE 1 arranged above FIGURE 2, are a functional representation of the magnetic recording and reproducing system of this invention;

FIGURE 3 is a series of curves illustrating the operation of the recording and reproducing system of this invention;

FIGURE 7 is a series of curves illustrating the magnetic properties of the magnetostrictive tube material under tension and as effected by an elastic wave.

Figure 1:
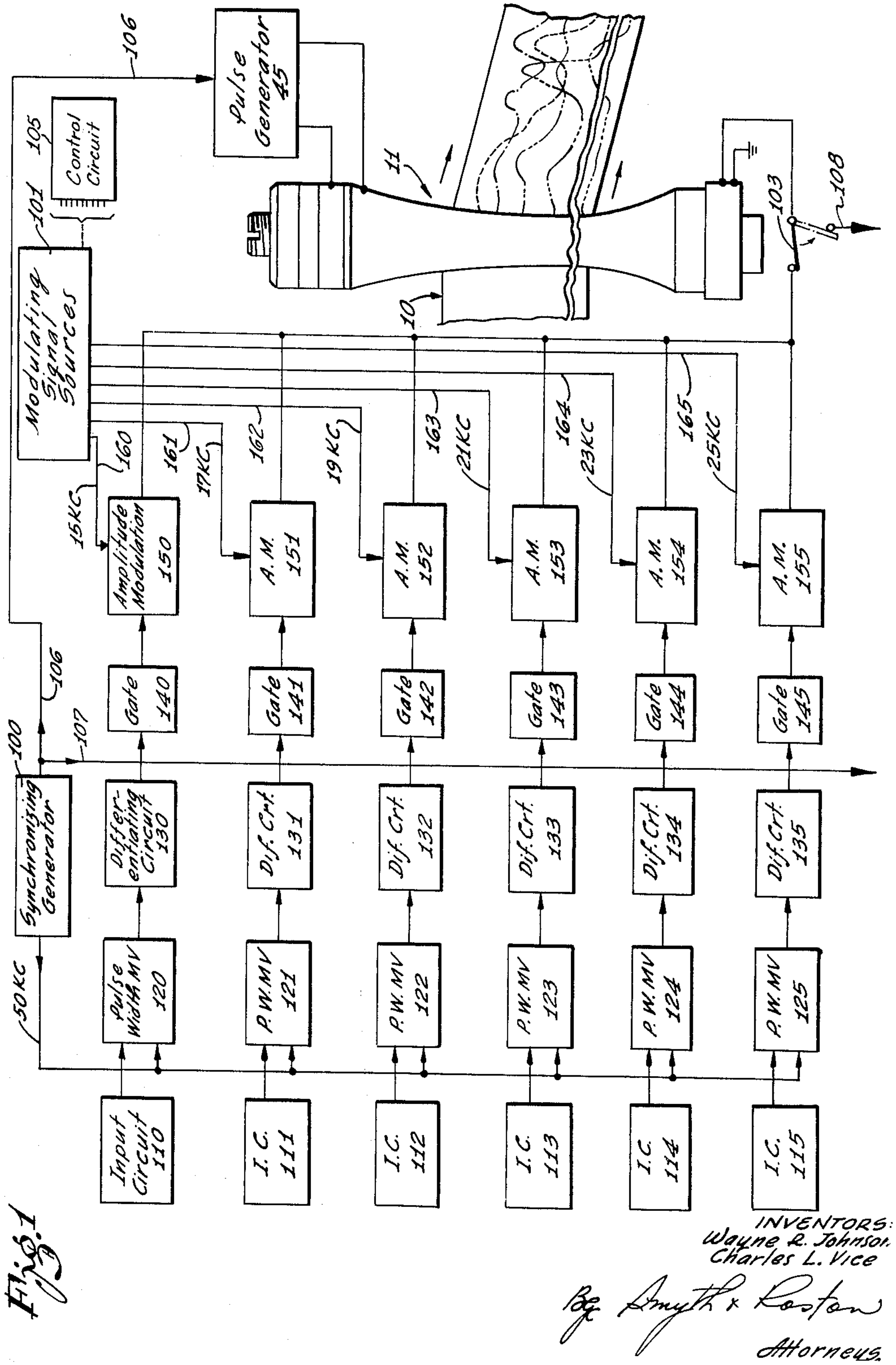
Figure 2:
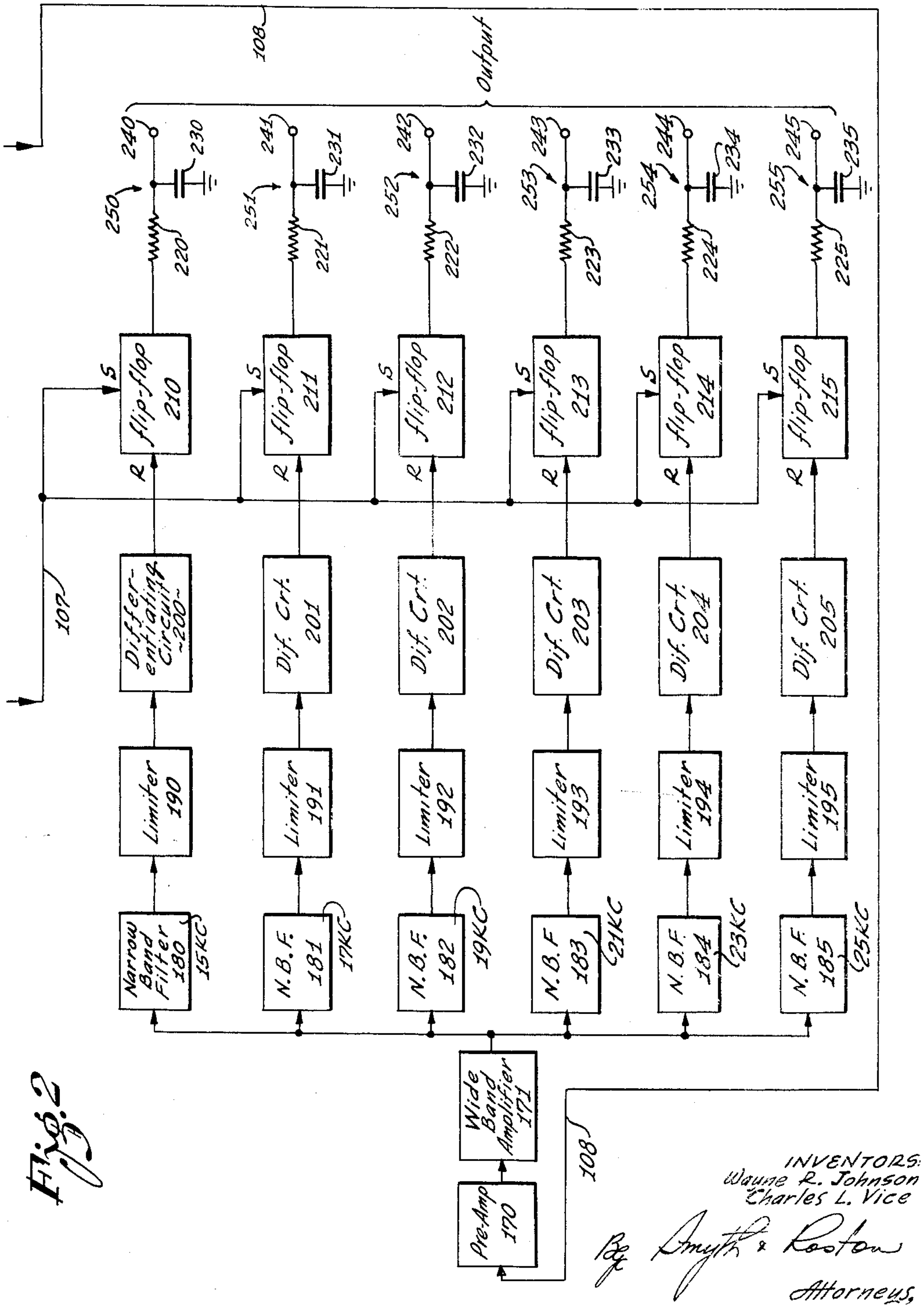

The transducing system of this invention, which is shown in FIGURES 1 and 2, with FIGURE 1 arranged above FIGURE 2, may be utilized to continuously record a number of varying electrical signals as curves on a moving magnetic tape 10. The transducing system may also be utilized to reproduce the recorded curves. The setting of a switch 103 determines whether the system is to be utilized to record information on the tape 10 or to reproduce recorded information from the tape 10. With the switch 103 set in a horizontal position as shown in FIGURE 1, curves representing varying input signals are recorded on the moving tape 10, and when the switch is moved to a vertical position, signals are reproduced from the moving magnetic tape 10 which correspond to the input varying signals.

The varying input signals, which may be six in number, are provided respectively from the input circuits 110 through 115 inclusive. Each of the input circuits 110 through 115 may be any electrical or electromechanical apparatus having an output which is a varying electrical signal to represent a different parameter. The varying electrical signals are provided respectively from the six input circuits 110 through 115 to six pulse-width multivibrators 120 through 125. The multivibrators 120 through 125 are trigger circuit arrangements which are simultaneously operated by synchronizing pulses from a synchronizing generator 100. Each of the output pulses from each of the multivibrators 120 through 125 has a duration dependent upon the magnitude of the respective input signal when the multivibrator is triggered. The synchronizing pulses which may, for example, be at a repetition rate of 50 kilocycles per second, simultaneously trigger the multivibrators 120 through 125 to periodically convert the instantaneous magnitude of the varying electrical signals supplied thereto to variable width, square-shaped pulses.

The output of each of the multivibrators 120 through 125, is, therefore, a series of square pulses initiated at a 50 kilocycle per second rate with each of the pulses having a duration dependent upon the instantaneous magnitude of the associated varying electrical signal. The maximum pulse width is 18 microseconds or slightly less than the 20 microseconds interpulse interval between synchronizing pulses from the synchronizing generator 100. A minimum pulse width duration of the pulses from the multivibrators 120 through 125 may be 2 microseconds. Each of the pulses, therefore, from the multivibrators 120 through 125 may have a duration between 2 and 18 microseconds depending upon the instantaneous magnitude of the associated varying input signal when a synchonizing pulse from the synchronizing generator simultaneously triggers the multivibrators 120 through 125.

In FIGURE 3, curve *a* illustrates a portion of the input signal provided by one of the input circuits 110 through 115, and curve *b* illustrates the variable-width pulses produced by the associated multivibrator at 20 microsecond intervals. As shown in curve *b*, the width of the pulses is proportional to the magnitude of the varying signal at the instant the synchronizing pulse is provided from the generator 100.

The series of varying duration pulses from each of the six multivibrators 120 through 125 are introduced respectively to six differentiating circuits 130 through 135. Each of the square pulses to the circuits 130 through 135 is converted to a sharp positive pulse at the beginning of each square pulse and a sharp negative pulse at the termination of each square pulse. The positive pulses are simultaneously provided from the differentiating circuits because the multivibrators 120 through 125 are simultaneously triggered by each synchronizing pulse. The negative pulses, however, are provided at different time positions in the interval between synchronizing pulses or between positive pulses from the circuits 130 through 135. The differentiated positive and negative pulses from the six circuits 130 through 135 are coupled respectively to six gate circuits 140 through 145 which remove the positive pulses derived at the beginning of each of the square pulses from the multivibrators 120 through 125. The output signal from each of the gate circuits 140 through 145 is, therefore, a series of sharp or short-duration negative pulses of equal magnitude but spaced at time positions dependent upon the instantaneous magnitudes of the input varying signals.

In each time slot initiated by the synchronizing pulses from the synchronizing generator 100, the negative pulses from the gate circuits 140 through 145, inclusive, have time positions which indicate the instantaneous magnitude of the associated input signals at the initiation of the time slot. The time positions of a number of successive negative pulses are illustrated in curve *c* of FIGURE 3. The positive pulses which are removed by one of the gate circuits 140 through 145 are shown as vertical dash lines to indicate the beginning of each time slot.

Each of the six series of negative pulses at a nominal repetition rate of 50 kilocycles per second from the gate circuits 140 through 145 are provided respectively to the six amplitude modulators 150 through 155. The six series of negative pulses function as six carrier signals which are each modulated by a different frequency identifying signal. The identifying signals, which may be sinusoidal, are coupled from the modulating signal sources 101 respectively through leads 160 through 165 to the modulators 150 through 155. The six identifying frequencies may, for example, be approximately 15 kilocyles, 17 kilocycles, 19 kilocycles, 21 kilocycles, 23 kilocycles and 25 kilocycles. Curve D of FIGURE 3 illustrates the modulation of the differentiated pulses illustrated in curve C by a 16.67 kilocycle modulating frequency which may be the exact frequency of the second (17 kilocycles) identifying frequency.

The modulators 150 through 155 provide an output pulse only at the time a negative differentiated pulse and the identifying frequency is simultaneously received. If either the negative pulses or the identifying frequency to a modulator is interrupted, output pulses from the modulator are not provided. Such modulators are conventional and are described illustratively in the text on Radio Engineering, Third edition, by F. E. Terman on page 481.

The type of modulation is referred to as pulse-amplitude modulation or PAM and is defined in the International Dictionary of Physics and Electronics published in 1956 by the D. Van Nostrand Company, Inc. as "Modulation in which the modulating wave is caused to amplitude-modulate a pulse carrier." In applicants' system the differentiated pulses are the carrier, and the sinusoidal identifying frequency is the modulating signal.

The pulses in each of the six pulse trains from the six modulators 150 through 155 indicate the magnitude of the associated input signal by the time position of the pulses, and the varying amplitude of the pulses is an identification of the wave train. It is actually the frequency of the variation of the amplitude of the pulses in each of the six pulse trains which identifies the pulse train. As is hereinafter described, when the information recorded on the tape is reproduced, the modulating frequencies are utilized to separate the six pulse trains.

The signal sources 101 may be controlled by a sequence control circuit 105 which interrupts the sinusoidal signals in accordance with a distinctive code for each. For example, the 15 kilocycle signal to the modulator 150 may be interrupted every 10 milliseconds for an interval of 2 milliseconds. Each of the six sources or oscillators 101 is in this manner effectively started and stopped in accordance with a different one of 6 distinctive patterns. During the interruption or blanking interval when a sinusoidal signal is interrupted, pulses do not appear at the output of the modulator 150. The modulators 150 through 155, therefore, function as gates as well as modulators with the gating pattern being under control of the sequence control circuit 105. As is hereinafter described, these patterns are utilized to visibly identify the curves representing the input signals as recorded on the magnetic tape 10. With the gating pattern of the modulator 150 being 8 milliseconds on and 2 milliseconds off for blanking, the output from the modulator 150 is a succession of 8 millisecond series of negative pulses modulated by the 15 kilocycle identifying signal alternated with blank intervals for 2 milliseconds.

The output signals for each of the modulators 150 through 155 are multipled to a toroidal winding 25 of a transducer head 11 which is positioned adjacent the magnetic tape 10. The transducer head 11, which is described in detail in my copending patent application Serial No. 733,165, filed on May 5, 1958, is briefly described herein because it is an important component in the transducing system of this invention.

Figures 4, 5:
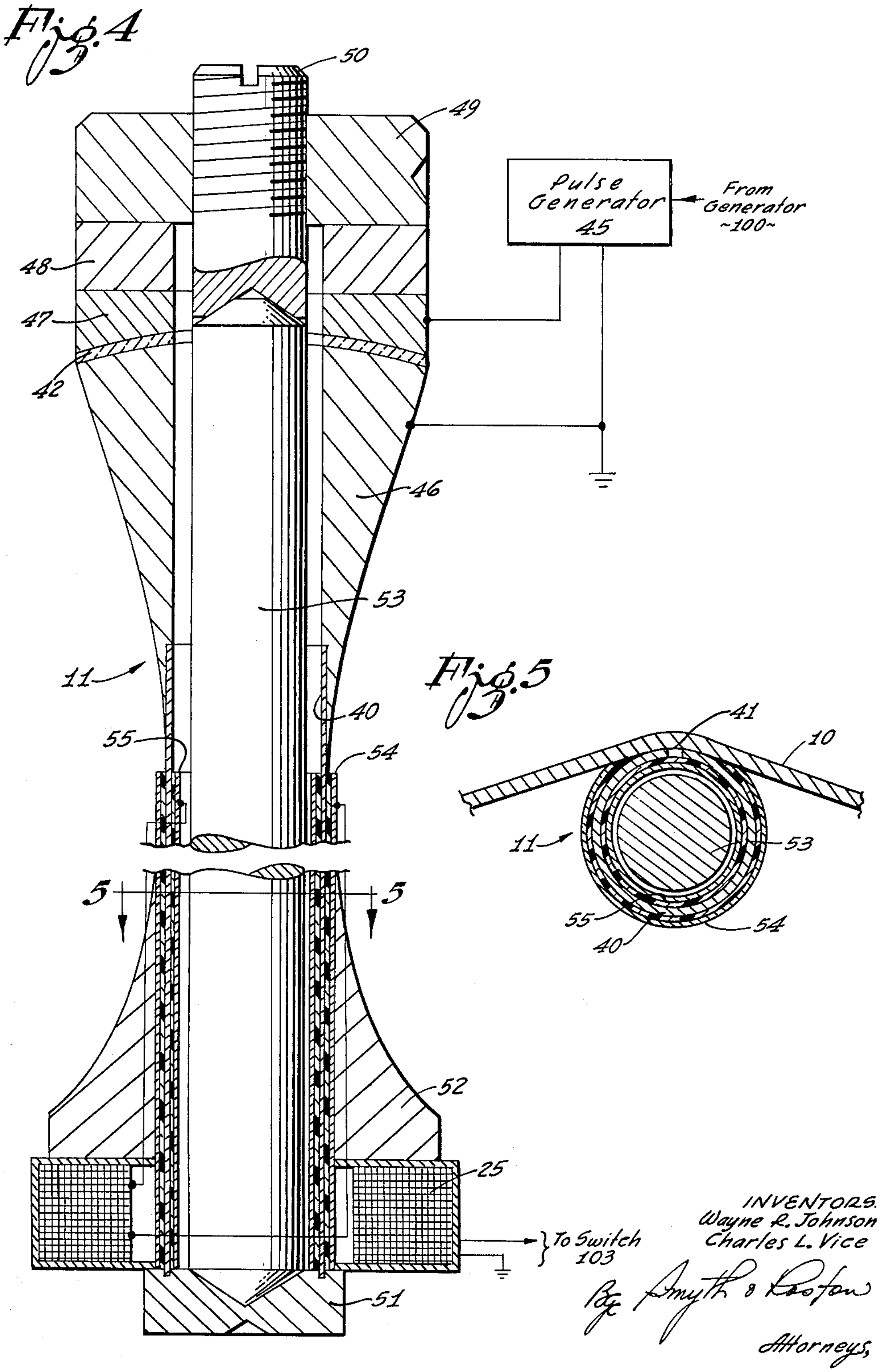
FIGURE 4 is a longitudinal sectional view of the transducer head utilized in the recording and reproducing system of this invention.
FIGURE 5 is a sectional view of the transducer head taken along lines 5—5 in FIGURE 4.
Figures 6, 8:
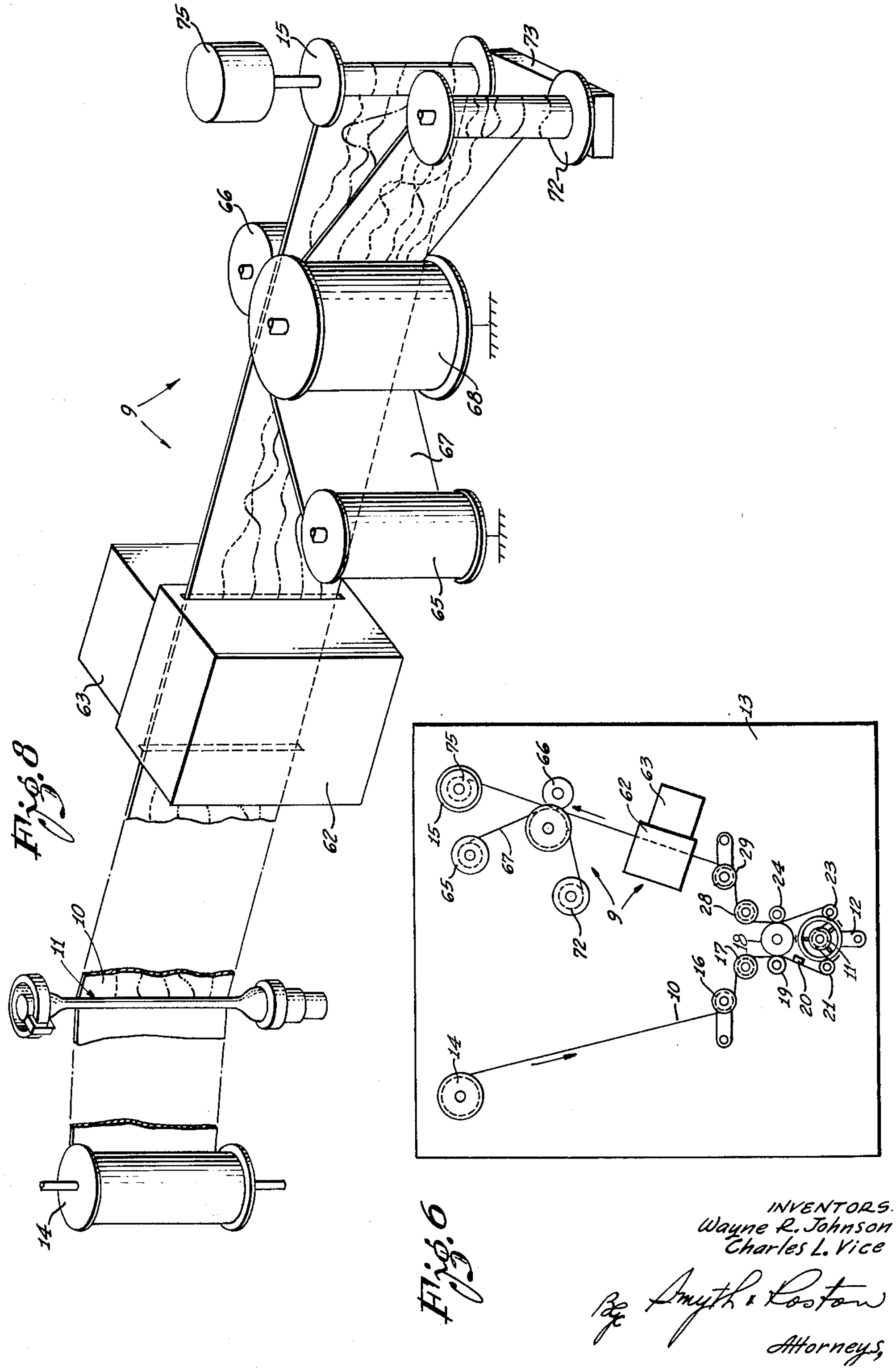
FIGURE 6 is a schematic diagram of equipment for progressing the magnetic tape adjacent the transducer head and through the printing equipment of the recording and reproducing system of this invention.
FIGURE 8 is a pictorial view of the printing portion of the recording and reproducing system of this invention.

The transducer head 11 which is shown particularly in FIGURES 4 and 5, functions as a transverse recording head for the tape 10 which moves longitudinally adjacent the stationary transducer head 11 in the direction indicated by the arrows. The tape transport equipment which is illustrated in FIGURE 6 includes a platform 13 supporting the head 11 by a bracket 12. The magnetic tape 10 is driven from a pay-out reel 14 adjacent the transducer head 11 and then through printing equipment 9 to a take-up reel 15. The magnetic tape 10 may be tensioned by individual motors, not shown, which drive the pay-out reels 14 and the take-up reel 15.

From the pay-out reel 14, the magnetic tape 10 passes over a spirng actuated tensioning arm 16 about which it turns to pass over a guide post 17. At the post 17, the magnetic tape 10 again makes a turn to pass between a drive capstan 18 and a rubber nipped roller 19 and then against a cleaning device 20 to another post 21 which directs the magnetic tape 10 over the transducer head 11 at a particular angle relative to the periphery of the transducer head 11. The magnetic tape 10 from the head 11 to the reel 15 passes along a path which is substantially the image of the path from the reel 14 to the head 11. More specifically, the path from the transducer head 11 is over a post 23 between a nip-roller 24 and the drive capstan 18, post 28 and the spring actuated tensioned arm 29 through inking and printing equipment 9 to the take-up reel 15.

As shown particularly in FIGURES 4 and 5, the transducer head 11 includes a tube 40 of magnetostrictive material which changes its magnetic properties with stress. The magnostrictive tube 40 which may be made of "permalloy" tape, has a non-magnetic gap 41 extending longitudinally along the tube 40. Elastic waves are transmitted longitudinally through the magnetostrictive tube 40 by a piezoelectric crystal 42 responsive to voltage pulses developed by a pulse amplifier 45. The pulse amplifier 45 is operated by the generator 100 at the same time that the multivibrators 120 through 125 are triggered to sample the six input signals. In this way, the transducer head 11 is enabled for the recording of information in synchronous relationship with the sampling of the variable input signals representing the different parameters. The pulses developed by the amplifier 45 are 0.1 microsecond in duration and have a repetition period equal to the repetition period of the synchronizing generator 100.

At one end of the magnetostrictive tube 40, an acoustic-transformer section 46 is mounted to couple acoustic waves generated by the piezoelectric crystal 42 to the magnetostrictive tube 40. The other side of the crystal 42 is attached to an annulus 47 which functions as a buttress against which the crystal 42 acts to deliver pulsed energy developed thereby to the acoustic transformer section 46. The annulus 47 is in turn backed by an annulus 48 of insulating material which is a good absorber of sound. The absorbent annulus 48 is in turn secured to a metal cap or nut 49 which is internally threaded to receive an adjusting screw 50.

At the opposite end of the magnetostrictive tube 40, a cap 51, the toroidal winding 25 and an acoustic absorbent section 52 are mounted. The waves generated from the crystal 42 are transmitted or propagated through the acoustic transformer section 46 and the magnetostrictive tube 40 at a speed of approximately 14,500 feet per second to the absorbing section 52. The structure including the magnetostrictive tube 40 is placed in tension by means of a strut 53 extending longitudinally through the tube 40 and bearing at one end in a depression formed in the inner end of the adjusting screw 50 and at the other end in a similar depression in the cap 51.

The effect of the stresses applied to the magnetostrictive tube 40 due to the acoustic waves from the piezoelectric crystal 42 are illustrated in FIGURE 7. In FIGURE 7, the hysteresis loop 116 is that of the unstressed tube 40 and the slope of the loop represents its permeability. When the tube 40 is stressed longitudinally due to the effect of the nut 49 on the adjusting screw 50, the shape of the hysteresis loop is changed materially to that of the hysteresis loop 117. The hysteresis loop 117 is nearly rectangular in form having a very steep slope almost to the point of saturation. Circumferentially, however, the effect of the tension causes the slope of the hysteresis loop or the permeability of the tube 40 to approach zero as indicated by the loop 118. In other words, the magnetostrictive tube 40 acts as though it were non-magnetic to circumferential fields. Circumferential fields are induced by a signal winding including the plated sections 54 and 55 which are plated on the exterior and interior respectively of the magnetostrictive tube 40. In this manner, a moving recording gap is provided along the acoustic wave which changes the condition of successive positions along the tube 40 from being effectively non-magnetic to being effectively magnetic. When the wave passes, the successive positions return to their normal effectively non-magnetic conditions determined by the applied stresses.

To briefly recapitulate, two conditions are necessary for recording on the tape 10: First, the pulse to be recorded must be introduced to the plated windings 54 and 55; and second a shock wave must be initiated through the magnetostrictive tube 40. The shock wave functions as a moving recording gap along the gap 41 travelling from one end of the tube 40 to the other with the recording function taking place only at the enabling wave. The gap 41 presents a high reluctance to the circumferential flux so that the circumferential flux passes through the tape 10. The circumferential flux developed by a pulse to the plated windings 54 and 55 alone is insufficient for effectively recording on the tape 10.

As indicated above, modulated waves representing samplings of the six varying signals are multipled from the modulators 150 through 155 and the switch 103 to the toroidal winding 25 of the transducer head 11 which is coupled to the plated windings 54 and 55. The sampled signals in the modulated waves are very short having a duration of approximately 0.1 microsecond as determined by the differentiating circuits 130 through 135. The transverse elastic pulses through the magnetostrictive tube 40 of the head 11 record the sampled signals at transverse positions on the tape 10 depending upon the timing therebetween. Each transverse pulse records six pulses on the magnetic tape 10 assuming that none of the six modulated waves are blanked under control of the circuit 105. If the magnitude of one of the varying input signals is not varying, the successive pulses derived therefrom have the same time position in each of the successive time slots. The successive pulses, therefore, have the same time reference with respect to each of the elastic pulses in the transducer head 11 so that the successive transverse pulses in the head 11 function to record the successive pulses on the magnetic tape 10 to form a longitudinal line.

The transverse location of the recorded pulses varies in accordance with the magnitude of the associated input electrical signal. For example, for a relatively large magnitude of the input signal from the circuit 110 in FIGURE 1, the pulse from the multivibrator 120 is relatively long. The pulse duration may illustratively be 15 microseconds. The 15 microsecond pulse is differentiated so that the negative pulse from the gate 140 has a time position of 15 microseconds after the synchronizing pulse which operated the multivibrator 120, and 5 microseconds before the next synchronizing pulse.

At the same time that each synchronizing pulse operates the multivibrator 120, a synchronizing pulse operates the pulse generator 45. Due to small delays in the operation of the multivibrator 120, differentiating circuit 130, gate 140 and toroidal winding 25, the pulse is received at the plated windings 54 and 55 (FIGURE 4), more than 15 microseconds after the elastic wave is initiated.

To illustrate the dimensions of the tracks and the spacing of successive pulses in adjacent transverse tracks, the magnetic tape 10 may be 2 inches in width and moving at a speed of 15 inches per second adjacent the transducer head 11. The successive transverse tracks are initiated at a 50 kilocycle rate so that the centerlines of the tracks are displaced by a distance of 0.3 mil, the distance the tape travels during 20 microseconds. The width of each of the transverse tracks may be 0.1 mil so that the distance between the edges of two adjacent tracks is 0.2 mil. What appears as a continuous line in the recorded curves is, therefore, a series of closely spaced pulses.

Each of the recorded pulses has a transverse dimension across the tape 10 and along the transverse track which depends upon the duration of the sampled pulse, the duration of the transverse wave and the speed of the transverse wave through the transducer head 11. With pulse and wave durations of 0.1 microsecond and a transverse wave speed of 14,500 feet per second, each sampled pulse is recorded along a distance of approximately 36 mils of a transverse track.

Due to a small delay introduced by the multivibrators, differentiating circuits, etc., and the toroidal winding 25, the pulses arrive at the plated windings 54 and 55 (FIGURE 2) slightly after the excitation of the transverse waves even when the sampled magnitiudes are quite small. The duration for recording a transverse track across the 2 inch tape 10 is approximately 22.2 microseconds for a recording wave speed of 14,500 feet per second. Each successive transverse wave is initiated before its preceding track is fully recorded because the waves are excited at 20 microsecond intervals. Signals are not recorded in the overlapping periods in two successive tracks because the small delays for the pulses center then in a 16 microsecond recording range at the center of each 22.2 microsecond recording track.

The particular pulse described above which has a time position of 15 microseconds after the synchronizing pulse is recorded toward the end of the transverse wave at a transverse position toward the bottom of the tape 10 in FIGURE 1. The transverse wave travels down the transducer head 11 because the crystal 42, as diagrammatically represented in FIGURE 1, is at the upper end of the transducer head 11. Conversely, if the input magnitude is small, the differentiated pulse follows the excitation of the transverse wave at a shorter interval so as to provide for a recording toward the top of the tape 10.

As the successive transverse tracks are recorded, each including six pulses, one for each of the input varying signals, six magnetic curves are simultaneously formed, recorded pulse after recorded pulse on the magnetic tape 10. One pulse is recorded for each of the six curves in each transverse track. When the sequence control circuit 105 is utilized, a different combination of recording and blanking intervals for each curve is provided so that the latent recorded curves on the magnetic tape 10 are differently coded.

Though, as briefly described above, the magnetic tape 10 from the recording head 11 passes through inking apparatus 9 to the take-up reel 15, a visible or a printed indication of the recorded curves may not be required. If it is not necessary to provide a visible indication of the recorded curves, the sequence control circuit 105 would not be utilized so that the six modulated waves would be uninterrupted. If the sequence control circuit 105 is not utilized, the magnetic curves on the tape 10 are substantially continuous with each track including six recorded signals. The magnetization of each of the curves varies sinusoidally at a frequency determined by the associated modulating signal from the sources 101. This variation would not be visibly detectable even if the tape 10 were inked in a manner hereinafter described.

Signals substantially similar to the varying input signals provided from the input circuits 110 through 115 may be recovered from the magnetically recorded curves on the magnetic tape 10. In order to reproduce the recorded information, the switch 103 (FIGURE 1) is moved to its vertical position so that the toroidal winding 25 of the transducer head 11 is coupled through a lead 108 to a preamplifier 170 (FIGURE 2). The transducer head 11 functions in a similar manner as that described above during the recording sequence with the pulse generator 45 successively exciting transverse pulses through the magnetostrictive tube 40 of the head 11. Each transverse wave as it successively passes adjacent the six recorded curves on the magnetic tape 10 provides a pulsed indication to the preamplifier 170. The amplitude of the reproduced pulse depends upon the magnetization of the curve adjacent which the transverse wave passes. With the intensity of the magnetization of each of the curves varying sinusoidally in accordance with different frequencies, the amplitudes of successive pulses derived from each of the curves varies correspondingly.

The reproduced signals, six pulses for each transverse track, are coupled from the preamplifier 170 through a wide band amplifier 171 to six narrow-band filters 180 through 185. The filters 180 through 185 are each tuned to pass a narrow band of frequencies centered respectively about the six modulating frequencies of 15, 17, 19, 21, 23 and 25 kilocycles per second. The output of each of the filters 180 through 185, is therefore, the modulating component of the successive pulses. Effectively, therefore it is the envelopes of each of the six multiplexed wave trains which are separately recovered. The identifying signals are in this manner utilized to separate the reproduced information.

The intelligence or the input information in each of the recovered signals is indicated by its phase because the phase of each of the reproduced signals varies in accordance with the instantaneous transverse location or position of the associated curve on the magnetic tape 10. Assuming, as indicated above, that the transverse waves pass down the transducer head 11 adjacent the tape 10, if the slope of the curve is negative, the successively reproduced pulses for the curve are successively displaced by greater intervals. If the transverse position of the curve does not vary, being a longitudinal line on the tape 10, the phase of the reproduced sinusoidal envelope or modulating signal does not vary. Any variation of the transverse position of the curve varies the phase of the reproduced signal. The phase of the separated signals varies, therefore, in accordance with the variations of the magnitude of the original input signals which determine the transverse positions of the curves.

The separated signals from the filters 180 through 185 are coupled respectively to six limiters 190 through 195 which limit their amplitudes to a predetermined value. The signals from the limiters 190 through 195 are, therefore, clipped or flat-top waves. The limited signals are provided respectively from the limiters 190 through 195 to six differentiating circuits 200 through 205. The positive differentiating pulses which occur at each 360 degrees of the signals, are inhibited in the circuits 200 through 205 and only the negative differentiated pulses are provided respectively to the reset terminals R of the circuits 210 through 215. The differentiating circuits 200 through 205 function in this manner as combined differentiating and gating circuits because the positive differentiating pulses are inhibited.

The flip-flop circuits 210 through 215 are bi-stable trigger circuits which are set under the control of the synchronizing generator 100. The generator 100 supplies the 50 kilocycle pulses through a lead 107 to the set terminals S of the six flip-flop circuits 210 through 215. At the same time, therefore, that a transverse wave is initiated in the transducer head 11 by the pulse generator 45 under control of the generator 100, the generator 100 also sets the six flip-flop circuits 210 through 215. The six reproduced pulses from the transducer head 11 due to each transverse wave in the head 11 provide for reset pulses respectively to reset the six flip-flop circuits 210 through 215.

Each of the flip-flop circuits 210 through 215 remains set for an interval determined by the phase of the separated signal which is, in turn, determined by the instantaneous transverse position of the associated recorded curve on the magnetic tape 10. If the position on a recorded curve is near the top of the magnetic tape 10 at the beginning of the transverse track across the tape 10 by the elastic pulse, the interval during which the associated flip-flop circuit remains set is quite brief. Conversely, as the transverse wave passes adjacent the curve toward the end of the transverse track, the associated flip-flop circuit remains set for a substantial duration. The variation in time during which the flip-flop circuits 210 through 215 may remain set in each time slot is between 2 and 18 milliseconds. The flip-flop circuits 210 through 215 are coupled respectively to integrating circuits 250 through 255 consisting of the resistors 220 through 225 and the capacitors 230 through 235. The capacitors 230 through 235 are coupled respectively between the resistors 220 through 225 and ground. The integrating circuits 250 through 255 provide a varying signal having an amplitude which depends upon the duration the associated flip-flop circuit remains set. The integrated signals which are provided at the output terminals 240 through 245 respectively correspond to the original input varying signals provided at the input circuits 110 through 115.

To briefly recapitulate, the input signals are recorded in graphic form on the magnetic tape 10 with each curve having a sinusoidally varying magnetic intensity. The frequency of the varying magnetic intensity, which is an identification of the curve, is utilized in the reproducing equipment to separate the six sets of signals derived respectively from the six curves. The separated signals are essentialy the sinusoidal identifying signals having an instantaneous phase which varies with the transverse position of the associated curve on the magnetic tape 10 and, therefore, with the instantaneous amplitude of the associated input signal. Each of the separated signals is utilized to provide a succession of reset pulses having time positions which vary in accordance with the phase of the separated signals. The reset pulses control the duration during which a signal is provided to the respectively associated integrating circuits 250 through 255. The outputs from the integrating circuits 250 through 255 at the terminals 240 through 245 are essentialy signals which correspond to the original input signals.

If the sequence control circuit 105 is not utilized the wave trains which are introduced to the transducer head 11 are continuous, with one pulse being recorded for each input signal in each transverse track. If the sequence control circuit 105 is utilized each of the modulated waves is interrupted in accordance with a distinctive pattern so that when the curves are made visible they are readily identifiable. Whether the sequence control circuit 105 is utilized or not, a visible and a printed indication of the recorded graphic representation on the magnetic tape 10 may be provided utilizing the printing apparatus 9 shown in FIGURES 6 and 8.

As shown in FIGURE 8, the tape passes from the pay-out reel 14, also described above in reference to FIGURE 6, adjacent the transducer head 11 and then from the transducer head 11 to magnetic inking apparatus 62 of the apparatus 9. Actually, the paths from the reel 14 to the transducer head 11 and from the head 11 to the apparatus 62 are not linear as described above in reference to FIGURE 6. A simplification of the path of the magnetic tape 10 is depicted in FIGURE 8 to illustrate its movement from the head 11 through the inking apparatus 62 to the take-up reel 15.

The printing apparatus 62 includes a blower, tank or other apparatus for dispersing magnetic particles or ink, such as carbonil powder or the like on the magnetized surface of the magnetic tape 10. After the tape 10, therefore, passes through the apparatus 62, the magnetic powder or solution is disposed on its surface in accordance with its magnetization. The magnetized curves on the tape 10 as recorded by the transducer head 11 are, therefore, visible as the tape 10 emerges from the apparatus 62.

As the tape 10 passes from the inking apparatus 62 to the take-up reel 15, it is pressed against a printing paper 67 which is moving at the same speed as the tape 10 and the same direction at the point of contact. The paper 67 is driven from a pay-out roll 65 by the rollers 68 and 66 together with the inking tape 10 and therefrom to a take-up roll 72. The paper 67 may be a wax or other type paper suitable for printing with the carbonil powder or other magnetic ink. The take-up reel 15 for the tape 10 is driven by a motor 75 and the take-up roll 72 for the paper 67 may also be driven by the motor 75 through a linkage 73 or by a separate motor, not shown.

As the ink is transferred from the tape 10 to the paper 67, the tape 10 still retains the magnetic image so that additional prints may be readily provided.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for recording a number of variable signals on a recording medium movable in a first direction, means for synchronously sampling the variable signals to provide a series of sampled signals each having characteristics representing the characteristics of the variable signals at progressive instants of time, means coupled to said sampling means for modulating the sampled signals in each of the series with an identifying signal having a distinctive frequency, and stationary transducer means coupled to said sampling means to become enabled in synchronous relationship with the sampling of the variable signals and disposed across the recording medium in a direction transverse to the first direction and disposed relative to the recording medium for recording the modulated series of sampled signals derived from each of the variable signals at positions on the recording medium in the transverse direction dependent upon the characteristics of the variable signals at progressive instants of time.

2. In a system for reproducing modulated signals recorded in a first direction on a recording medium movable in a second direction transverse to the first direction where the modulated signals are recorded on the recording medium at different positions in the first direction in successive tracks in the first direction in representation of the values of a plurality of different parameters and where the recorded signals for each of the different parameters are provided with modulations distinctive from the modulations of the recorded signals for the other parameters.

transducer means disposed relative to the movable recording medium for successively reproducing the signals in the tracks in the first direction on the movable recording medium to provide for each of said reproduced signals an amplitude dependent upon the instantaneous modulations of the signals recorded on the medium for the associated parameter, means coupled to said transducer means for recognizing the modulations of the successive reproduced signals for each of said parameters and for separating the reproduced signals for each of the parameters from the reproduced signals for the other parameters in accordance with the recognition of such modulations, and means coupled to said separating means for converting the separated signals representing each individual parameter to a variable electrical signal having an instantaneous amplitude corresponding to the instantaneous position in the first direction of the recorded signals on the recording medium for that parameter.

3. A system for recording in a first direction a graphic representation of the values of a plurality of variable parameters on a recording medium movable in a second direction transverse to the first direction, including, means for periodically converting the instantaneous value of each of the variable parameters to time duration pulses whereby a series of time duration pulses is provided for each of the variable parameters, means coupled to said converting means for amplitude modulating each of said series of pulses with a different frequency identifying signal, and transducer means coupled to said modulating means and disposed relative to the recording medium in the first direction for recording one modulated time duration signal for each of the modulated series of pulses on each of a number of successive transverse tracks on the recording medium and for recording each such signal at a particular position in the first direction on the medium in accordance with the time modulation of the signal.

4. In a system for recording and reproducing variable information upon a recording medium movable in a first direction, means for receiving a number of different variable input signals each representing a different one of a plurality of parameters, means coupled to said receiving means for periodically sampling each of the variable input signals, means coupled to said sampling means for modulating the successively sampled signals for each of the variable signals with an identifying signal having a frequency different from the identifying signals for the other variable signals, transducing means coupled to said modulting means and disposed relative to said recording medium for recording said modulated signals on said recording medium, the transducing means being constructed to provide a recording of information on the medium at positions in a direction transverse to the first direction in accordance with the characteristics of the variable input signals and upon an enabling of the transducing means, means coupled to the transducing means and the sampling means for obtaining an enabling of the transducing means at the same time as the sampling of the variable input signals, means coupled to said recording medium for reproducing said recorded modulated signals, means coupled to said reproducing means for separating said reproduced modulated signals in accordance with said identifying signals, and means coupled to said separating means for developing from each of said separated signals a variable output signal which corresponds to the associated variable input signal.

5. In a system for recording on a recording medium a number of variable signals each representing a different variable parameter where the recording medium is movable in a first direction, means for synchronously sampling the variable signals to provide a series of sampled signals for each of the variable signals, means coupled to said sampling means for modulating each of the series of sampled signals with an identifying signal having a distinctive frequency, transducer means coupled to said modulating means and disposed relative to the recording medium in a second direction transverse to the first direction for recording the modulated series of sampled signals derived from each of the varying signals, the transducing means being constructed to record signals on the medium upon an enabling of the transducing means and at position in the transverse direction in accordance with the characteristics of the variable signals, and a synchronous generator coupled to said sampling means and to said transducer means for operating said sampling means to sample each of the variable signals at the same time that the said transducer means is enabled.

6. A system for simultaneously reproducing a number of variable signals recorded on a recording medium movable in a first direction where the instantaneous magnitude of each of the signals is indicated by its instantaneous position in successive transverse tracks in a second direction transverse to the first direction as recorded on the recording medium and where the identity of each of the signals is indicated by an individual frequency in the variation of intensity of the recorded variable signal, including, transducer means disposed relative to the recording medium for successively reproducing the variable signals recorded in the successive transverse tracks across the recording medium, frequency discriminating means coupled to said transducer means for separating the reproduced portions for each of the recorded variable signals from the reproduced portions for the other recorded variable signals, and means coupled to the frequency discriminating means for detecting the information represented by the reproduced signals passing through the frequency discriminating means.

7. A system for simultaneously reproducing a number of variable signals recorded on a recording medium movable in a first direction where the instantaneous magnitude of each of the signals is indicated by its instantaneous position in successive transverse tracks in a second direction transverse to the first direction as recorded on the recording medium and where the identity of each of the signals is indicated by an individual frequency in the variation of intensity of the recorded variable signal, including, transducer means disposed in the second direction relative to the recording medium for successively reproducing each of the variable signals recorded in the successive transverse tracks on the recording medium and for providing each reproduced signal with a phase dependent upon the position in the second direction of the signal recorded on the medium, frequency discriminating means for each particular one of the reproduced signals and coupled to said transducer means for separating the reproduced signal representing each variable signal from the reproduced signals representing the other variable signals, and means coupled to said frequency discriminating means for developing a variable signal having an instantaneous magnitude related to the instantaneous phase of each reproduced signal at progressive instants of time.

8. A system for reproducing from a medium movable in a first direction a number of graphically represented variable signals which have been recorded in successive tracks on the medium in a second direction transverse to the first direction at positions dependent upon the value of the variable signals and which have been modulated with alternating identifying signals having an individual frequency for each of the variable signals, including, transducer means disposed in the transverse direction relative to the recording medium for successively reproducing the graphically represented and modulated signals on the recording medium, the transducer means being constructed to be periodically enabled and to reproduce the information on the recording medium upon each such enabling and in accordance with the position of the recorded information in the transverse tracks on the recording medium, means coupled to said transducer means for periodically enabling the transducer means, means coupled to said transducer means for separating said reproduced signals in accordance with the frequencies of the modulating identifying signals, and means coupled to said separating means for developing a signal having a variable amplitude from the successively reproduced signals separated for each of the variable positions and in accordance with the relative time of reproduction of the signals in each of the successive tracks.

9. A magnetic transducing system for processing a plurality of variable signals recorded on a recording medium movable in a first direction, including, means for periodically sampling each of the variable signals and for providing periodically a sampled signal for each of the variable signals to form a series of sampled signals for each of the variable signals, means coupled to said sampling means for amplitude modulating each of the series of sampled signals with an identifying signal having a particular frequency individual to the associated variable signal, a stationary transducer head disposed relative to said recording medium and to said modulating means for recording the successively sampled signals for each of the amplitude-modulated variable signals in successive tracks on said recording medium in a second direction transverse to the first direction at positions dependent upon the characteristics of the variable signals, the transducer head being constructed to record signals in the successive tracks upon each enabling of the transducer head, means coupled to the transducer head and to the sampling means for enabling the transducing means synchronously with the sampling of the variable signals, control means operatively coupled to the transducer head and operative in a first state to obtain a recording of signals by the transducer head on the recording medium and operative in a second state to obtain a reproduction by the transducer head of signals previously recorded on the recording medium, and reproducing means coupled to said transducer member and to the control means and responsive to the second state of operation of the control means for individually recovering from the transducer head each of the signals reproduced by the transducer head in accordance with the amplitude modulations of such signal at the particular frequency.

10. A magnetic transducing system in accordance with claim 9, including, means coupled to said transducer member for recognizing the modulations of the reproduced signals at each particular frequency of said curves and for separating the reproduced signals representing each variable signal from the reproduced signals representing the other variable signal, and means coupled to said separating means for converting the separated signals representing each variable signal to a variable electrical signal having an instantaneous amplitude corresponding to the instantaneous position in the transverse direction of the signals recorded on the recording medium.

11. In a system for reproducing modulated signals recorded in a first direction on a recording medium movable in a second direction transverse to the first direction where the modulated signals are recorded on the recording medium at different positions in the first direction in successive tracks in the first direction in representation of the values of a plurality of different parameters and where the patterns of signals recorded for the different parameters intersect at different positions and where the recorded signals for each of the different parameters are provided with modulations distinct from the modulations of the recorded signals for the other parameters, transducer means disposed relative to the movable recording medium in the first direction for sequentially reproducing the signals in the successive tracks on the recording medium and for providing the signals with characteristics dependent upon the position of the signals in the first direction on the recording medium and upon the modulations distinctive to the individual parameters, means coupled to the transducer means and responsive to the modulations distinctive to each parameter for channelizing the reproduced signals for each parameter into an individual channel in accordance with the modulations distinctive to that parameter, and means coupled to the last mentioned means for detecting the signals passing through each individual channel to obtain a reproduction of the parameter represented by the signals in that channel.

12. In a system for reproducing modulated signals recorded in a first direction on a recording medium movable in a second direction transverse to the first direction where the modulated signals are recorded on the recording medium at different positions in the first direction in successive tracks in the first direction in representation of the values of a plurality of different parameters and where the modulated signals for each parameter intersect the modulated signals for other parameters in the plurality and where the recorded signals representing each of the different parameters are provided with modulations distinctive from the modulations of the recorded signals for the other parameters, transducer means disposed relative to the movable recording medium in the first direction for producing signals upon the enabling of the transducer means and in accordance with the position of the recorded signals in the first direction on the recording medium and in accordance with the modulations distinctive to each individual parameter, means coupled to the transducer means for periodically enabling the transducer means, means coupled to the transducer means and responsive to the modulations of the signals produced by the transducer means for separating the signals having each individual modulation from the signals having the other individual modulations, and means coupled to the separating means for converting the separated signals representing each individual parameter into signals having amplitude modulations representing the individual parameters at the successive instants of time.

References Cited by the Examiner

UNITED STATES PATENTS

| | | | |
|---|---|---|---|
| Re. 23,919 | 1/55 | Hawkins | 340—174 |
| 2,245,286 | 6/41 | Marzocchi | 179—100.2 |
| 2,907,621 | 10/59 | Eisler et al. | 179—15 |
| 2,921,989 | 1/60 | Serrell | 179—100.2 |
| 2,972,733 | 2/61 | Bucy | 340—15 |
| 3,053,941 | 9/62 | Johnson | 340—174.1 |

IRVING L. SRAGOW, *Primary Examiner.*

EVERETT R. REYNOLDS, *Examiner.*